(12) United States Patent
Onno et al.

(10) Patent No.: US 9,584,844 B2
(45) Date of Patent: Feb. 28, 2017

(54) METHOD AND APPARATUS FOR MATCHING OF CORRESPONDING FRAMES IN MULTIMEDIA STREAMS

(71) Applicant: THOMSON LICENSING, Issy de Moulineaux (FR)

(72) Inventors: Stephane Onno, Saint Gregoire (FR); Christoph Neumann, Rennes (FR); Serge Defrance, Rennes (FR)

(73) Assignee: THOMSON LICENSING SAS, Issy les Moulineux (FR)

( * ) Notice: Subject to any disclaimer, the term of this patent is extended or adjusted under 35 U.S.C. 154(b) by 0 days.

(21) Appl. No.: 14/547,100

(22) Filed: Nov. 18, 2014

(65) Prior Publication Data

US 2015/0143416 A1 May 21, 2015

(30) Foreign Application Priority Data

Nov. 21, 2013 (EP) .................... 13306595

(51) Int. Cl.
*H04N 7/10* (2006.01)
*H04N 21/2668* (2011.01)
(Continued)

(52) U.S. Cl.
CPC ...... *H04N 21/2668* (2013.01); *H04N 21/4307* (2013.01); *H04N 21/4394* (2013.01);
(Continued)

(58) Field of Classification Search
CPC ............ H04N 21/2668; H04N 21/4307; H04N 21/4394; H04N 21/44016; H04N 21/25891; H04N 21/23418; H04N 21/812; H04N 21/2353
(Continued)

(56) References Cited

U.S. PATENT DOCUMENTS 3,865,973 A 2/1975 Masuda et al.
5,861,881 A * 1/1999 Freeman et al. ............. 715/201
(Continued)

FOREIGN PATENT DOCUMENTS

EP 2648418 10/2013
EP 2765781 8/2014
(Continued)

OTHER PUBLICATIONS

Hanjalic: "Shot-Boundary Detection: Unraveled and Resolved?"; IEEE Transactions on Circuits and Systems for Video Technology, vol. 12, No. 2. Feb. 2002; pp. 90-105.
(Continued)

*Primary Examiner* — Michael B Pierorazio

(57) ABSTRACT

A method and an apparatus for matching corresponding frames in two multimedia streams are suggested. The first multimedia stream is an original multimedia stream for which meta-data are available. The second multimedia stream is broadcasted or multi-casted multimedia stream and has undergone processing steps such that the meta-data of the original video stream are no more available or no longer reliable. The matching of corresponding frames in the two multimedia streams is based on the comparison of audio fingerprints and the detection of shot boundaries. Matching corresponding frames with frame accuracy enables inserting targeted content like advertisements into a sequence of video frames especially in a broadcast or multicast environment where meta-data and time markers cannot be relied upon.

16 Claims, 6 Drawing Sheets

Figure 1A:
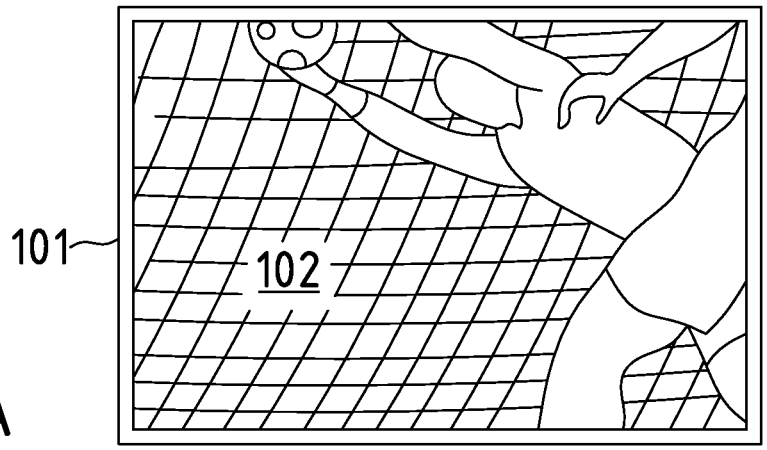

(51) Int. Cl.
    *H04N 21/81*      (2011.01)
    *H04N 21/43*      (2011.01)
    *H04N 21/439*     (2011.01)
    *H04N 21/44*      (2011.01)
    *H04N 21/8358*    (2011.01)

(52) U.S. Cl.
    CPC ..... *H04N 21/44016* (2013.01); *H04N 21/812* (2013.01); *H04N 21/8358* (2013.01)

(58) Field of Classification Search
    USPC ........................................................ 725/34
    See application file for complete search history.

(56) References Cited

U.S. PATENT DOCUMENTS

| | | | |
|---|---|---|---|
| 5,892,554 A * | 4/1999 | DiCicco et al. | 348/584 |
| 6,100,925 A * | 8/2000 | Rosser et al. | 348/169 |
| 6,137,834 A * | 10/2000 | Wine et al. | 375/240 |
| 6,456,591 B1 * | 9/2002 | Mishra | 370/229 |
| 6,690,428 B1 | 2/2004 | Hudelson et al. | |
| 6,996,173 B2 * | 2/2006 | Wu et al. | 375/240.1 |
| 7,619,546 B2 | 11/2009 | McGrath | |
| 8,042,132 B2 * | 10/2011 | Carney et al. | 725/37 |
| 8,094,872 B1 * | 1/2012 | Yagnik et al. | 382/100 |
| 8,122,468 B2 | 2/2012 | Begeja et al. | |
| 8,328,640 B2 | 12/2012 | Rom et al. | |
| 8,413,205 B2 * | 4/2013 | Carney et al. | 725/135 |
| 2003/0058935 A1 * | 3/2003 | Lippincott | 375/240.2 |
| 2003/0123546 A1 | 7/2003 | Falik et al. | |
| 2004/0139462 A1 * | 7/2004 | Hannuksela et al. | 725/32 |
| 2004/0189873 A1 * | 9/2004 | Konig | G06F 17/30802 348/607 |
| 2004/0199387 A1 * | 10/2004 | Wang et al. | 704/243 |
| 2004/0239764 A1 | 12/2004 | Overton et al. | |
| 2005/0108751 A1 | 5/2005 | Dacosta | |
| 2005/0120132 A1 * | 6/2005 | Hutter | 709/234 |
| 2006/0140498 A1 | 6/2006 | Kudo et al. | |
| 2006/0280246 A1 * | 12/2006 | Alattar et al. | 375/240.15 |
| 2007/0067808 A1 | 3/2007 | DaCosta | |
| 2007/0110150 A1 * | 5/2007 | Wang et al. | 375/240.1 |
| 2007/0124756 A1 * | 5/2007 | Covell et al. | 725/18 |
| 2007/0124775 A1 | 5/2007 | DaCosta | |
| 2007/0285815 A1 * | 12/2007 | Herre et al. | 360/13 |
| 2008/0022005 A1 * | 1/2008 | Wu et al. | 709/231 |
| 2008/0030617 A1 * | 2/2008 | Sasai et al. | 348/500 |
| 2008/0040743 A1 * | 2/2008 | Dharmaji | 725/35 |
| 2008/0062315 A1 * | 3/2008 | Oostveen | G10L 25/48 348/500 |
| 2008/0168520 A1 * | 7/2008 | Vanderhoff et al. | 725/131 |
| 2008/0170630 A1 | 7/2008 | Falik et al. | |
| 2008/0177864 A1 * | 7/2008 | Minborg et al. | 709/219 |
| 2008/0195468 A1 | 8/2008 | Malik | |
| 2008/0262912 A1 | 10/2008 | Gargi | |
| 2009/0087161 A1 * | 4/2009 | Roberts et al. | 386/66 |
| 2009/0122189 A1 * | 5/2009 | Wang et al. | 348/500 |
| 2009/0122197 A1 * | 5/2009 | Neal | 348/708 |
| 2009/0144325 A1 * | 6/2009 | Chastagnol et al. | 707/104.1 |
| 2009/0147859 A1 * | 6/2009 | McGowan et al. | 375/240.26 |
| 2009/0154816 A1 * | 6/2009 | Swazey et al. | 382/232 |
| 2009/0167942 A1 * | 7/2009 | Hoogenstraaten | H04N 7/24 348/500 |
| 2009/0262244 A1 * | 10/2009 | Buttimer et al. | 348/572 |
| 2009/0304082 A1 * | 12/2009 | Radhakrishnan et al. | 375/240.15 |
| 2010/0110186 A1 * | 5/2010 | Julia et al. | 348/143 |
| 2010/0199300 A1 | 8/2010 | Meur et al. | |
| 2010/0226394 A1 | 9/2010 | Tapie et al. | |
| 2010/0235472 A1 | 9/2010 | Sood et al. | |
| 2010/0287196 A1 * | 11/2010 | Shields | G06F 17/30781 707/769 |
| 2010/0303100 A1 | 12/2010 | Niamut et al. | |
| 2010/0322417 A1 | 12/2010 | Altmann | |
| 2010/0325657 A1 * | 12/2010 | Sellers et al. | 725/32 |
| 2010/0329337 A1 * | 12/2010 | Mulroy | 375/240.13 |
| 2010/0333148 A1 | 12/2010 | Musha et al. | |
| 2011/0004892 A1 * | 1/2011 | Dharmaji | 725/9 |
| 2011/0069230 A1 | 3/2011 | Polumbus et al. | |
| 2011/0122315 A1 * | 5/2011 | Schweiger et al. | 348/500 |
| 2011/0289538 A1 | 11/2011 | Begen et al. | |
| 2011/0317078 A1 | 12/2011 | Johns et al. | |
| 2012/0062793 A1 * | 3/2012 | Vanderhoff | 348/514 |
| 2012/0079541 A1 | 3/2012 | Pan | |
| 2012/0084812 A1 | 4/2012 | Thompson et al. | |
| 2012/0114302 A1 * | 5/2012 | Randall | 386/241 |
| 2012/0117584 A1 | 5/2012 | Gordon | |
| 2012/0144435 A1 | 6/2012 | Spilo et al. | |
| 2012/0216230 A1 | 8/2012 | Vare et al. | |
| 2012/0239621 A1 * | 9/2012 | Savenok et al. | 707/634 |
| 2012/0242900 A1 | 9/2012 | Huang et al. | |
| 2012/0259697 A1 * | 10/2012 | Tadayon | 705/14.51 |
| 2012/0272256 A1 * | 10/2012 | Bedi | 725/5 |
| 2013/0007819 A1 | 1/2013 | Choi et al. | |
| 2013/0042262 A1 | 2/2013 | Riethmueller | |
| 2013/0081095 A1 | 3/2013 | Kitazato | |
| 2013/0086609 A1 | 4/2013 | Levy et al. | |
| 2013/0097643 A1 | 4/2013 | Stone et al. | |
| 2013/0276033 A1 | 10/2013 | Francini et al. | |
| 2013/0312018 A1 * | 11/2013 | Elliott et al. | 725/12 |
| 2014/0028914 A1 * | 1/2014 | Polak et al. | 348/515 |
| 2014/0229975 A1 * | 8/2014 | Bolden et al. | 725/32 |
| 2014/0282665 A1 * | 9/2014 | Arini | 725/18 |

FOREIGN PATENT DOCUMENTS

| | | |
|---|---|---|
| WO | WO0237828 | 5/2002 |
| WO | WO2004075565 | 9/2004 |
| WO | WO2007041371 | 4/2007 |
| WO | WO2012143802 | 10/2012 |
| WO | WO2013008255 | 1/2013 |

OTHER PUBLICATIONS

Search Report dated Mar. 27, 2014.
Shrestha et al., "Synchronization of Multiple Camera Videos Using Audio-Visual Features", IEEE Transactions on Multimedia, vol. 12, No. 1, Jan. 2010, pp. 79-92.
Howson et al., "Second Screen TV Synchronization", 2011 IEEE International Conference on Consumer Electronics—Berlin (ICCE—Berlin), Berlin, Germany, Sep. 8, 2011, pp. 361-365.

* cited by examiner

METHOD AND APPARATUS FOR MATCHING OF CORRESPONDING FRAMES IN MULTIMEDIA STREAMS

FIELD

A method and an apparatus for frame accurate matching of corresponding frames of multimedia streams are described. In particular, the disclosure is related to a method and an apparatus for matching of corresponding frames in a broadcasted multimedia stream and in a corresponding original multimedia stream, respectively.

BACKGROUND

Broadcasting companies or broadcasters transmit news, shows, sports events and films as programs to viewers who receive the programs through terrestrial, satellite and/or cable broadcast signals.

Advertisements accompanying such programs are very important for the business model of broadcasters. It is common practice that broadcasters include advertisements in dedicated advertisement breaks during a program. With the emergence of TV receivers offering time shift recording and viewing functionality, many viewers tend to skip the advertisement breaks by jumping forward in the recorded program or by switching into the fast forward mode. The reason for doing so is that, firstly, most of the times the advertisements are not relevant for the majority of the viewers and, secondly, it is very easy to avoid the advertisement breaks utilizing the time-shift functionality. Under such circumstances the main goal of the client of the broadcaster, who is paying for the advertisement placement, is missed because the advertisement does not reach out anymore to potential customers of the company who has placed the advertisement.

The obvious weakness of placing advertisements in advertisement breaks can be alleviated by embedding the advertisement in the program itself. The simplest approach for embedding the advertisement is to create a composed image by inserting the advertisement as a text box or banner into a number of video frames of the broadcasted program. This concept is known from prior art and will be explained in greater detail with reference to FIGS. 1A and 1B.

A more elegant approach is to insert the advertisement as an integral part of the video sequence e.g. displaying the advertisement on a billboard shown in a video sequence. However, in order to create a good impression and maintain a natural look of the composed image, the advertisement needs to be adapted to the rest of the scene in the video sequence. Typically, this approach requires human intervention to obtain results of good quality.

Embedding advertisement into a composed image makes it for the viewer practically impossible to avoid the advertisement. But embedding the advertisement alone still fails to make the advertisement more relevant for the viewer. In order to address this issue, the displayed advertisement needs to take into account individual interests of the viewer or, in other words, the advertisements need to be targeted to the viewer.

The approach of providing targeted content is known from video games for example. The selection of the advertisements is made by means of individual information stored in a game console of a videogame. WO 2007/041 371 A1 describes how user interactions in a video game are used to target advertisements. E.g. if the user selects a racing car of a specific brand, then an advertisement of the same brand is displayed in the video game.

The insertion of targeted content in video games is comparatively simple because the creator of the video game has full control of the scenery and can, therefore, provide scenes that are suitable for advertisement insertion. In addition, in a video game the video processing is completely controlled inside the video console. In a broadcast environment the insertion of targeted content is more complex.

In the co-pending European patent application EP 13 305 151.6 of the same applicant, it is suggested to identify in a video sequence a set of frames appropriate for inserting advertisements as targeted content. According to that method two sets of meta-data are created. The first set of metadata relates to the video content, e.g. frame numbers of those frames susceptible for inlaying the advertisement, coordinates where the advertisement should be placed, a geometrical shape of the advertisement, the used color map, light setting, etc. A second group of meta-data provides information that is required for selecting the appropriate content in the video sequence. The second set of meta-data comprises therefore information about the inserted content itself, the context of the scene, the distance of a virtual camera, etc. The method of inserting targeted content described in EP 13 305 151.6 works well as long as all meta-data are completely available.

However, in a video broadcast system, the video signal is transformed along its distribution chain from the broadcaster to the premises of the viewer. It may be transcoded, re-encoded, converted from digital to analog signals and vice versa, audio tracks may be edited or removed or changed. These transformations are generally not under the control of a single entity. Therefore, time markers or any other meta-data may get lost during these transformations. Potential remedies for this problem are video and/or audio watermarks. Video and audio watermarks are not susceptible to the mentioned transformations and could therefore serve as invariable markers in the video and/or audio sequence. However, content owners do not always accept to include watermarks because they are concerned by a potential negative effect on the quality perception of the viewer. Some broadcasters refuse to include watermarks because they do not want to modify the content broadcast workflow.

Also for the following reasons watermarking is not a preferred technology for the sole purpose of synchronization of two video streams or identifying matching corresponding frames in two video streams. Watermarking is based on a symmetric key for embedding and decoding the watermarks. The key and the process of watermarking must be based on secure hardware which is too costly for many consumer electronics applications. In addition to that, scaling watermarking for a large number of devices is also an issue.

For these reasons, video and/or audio watermarks are no feasible solution to compensate for the loss of time markers and meta-data.

Video fingerprinting is another technique that may provide frame accurate synchronization of a broadcasted or multi-casted video stream with the corresponding original video stream. However, matching a video fingerprint (signature) extracted by the video player against all signatures of the video provided by a server is costly and cannot be carried out in real-time by a set top box (STB).

Therefore, there remains a need for a solution to match one or several corresponding frame(s) in a broadcasted multimedia stream with the corresponding original multimedia stream with frame accuracy.

SUMMARY

A method and a television receiver for matching corresponding frames with frame accuracy into a transmitted multimedia stream are suggested. The term "transmitted" or "transmission" includes broadcasting as well as multicasting utilizing any kind of appropriate medium for doing so. The disclosed method and apparatus work in real-time and do not require computing overhead compared to conventional solutions. A further advantage is that the underlying concept is unsusceptible to processing or transforming steps of the original video along the broadcast chain.

According to a first aspect, an embodiment of the present invention suggests a method for matching corresponding frames in a first and a second multimedia stream containing the same multimedia data. The multimedia data include at least a video and an audio stream. The first multimedia stream (v) is provided with meta-data. The method comprises:

- receiving the second multimedia stream containing the same video data as the first multimedia stream with incomplete meta-data;
- receiving the meta-data and audio-fingerprints of the first multimedia stream;
- detecting a shot boundary in the second multimedia stream and a first video frame following the shot boundary in the second multimedia stream;
- determining the audio-fingerprint of a sequence of frames including the first video frame;
- matching the determined audio-fingerprint with an audio-fingerprint of the first multimedia stream;
- determining a video sequence in the first multimedia stream corresponding to the matching audio-fingerprint;
- detecting a shot boundary in the video sequence in the first multimedia stream; and
- identifying a second video frame following the shot boundary in the video sequence, wherein the second video frame matches with the first video frame. The method according to this embodiment of the invention enables frame accurate matching corresponding frames in a first and a second multimedia stream without requiring a lot of computing overhead.

Matching corresponding frames with frame accuracy enables inserting targeted content like advertisements into a sequence of video frames especially in a broadcast or multicast environment where meta-data and time markers cannot be relied upon. According to an embodiment of the suggested method content is inserted into the second multimedia stream. Frame accurate insertion of content into the multimedia stream is a prerequisite for a good quality perception of the viewer.

According to an advantageous embodiment the method comprises requesting content from a server before inserting the content into the second multimedia stream. The server can provide for a variety of different contents to be inserted into the multimedia stream.

In an advantageous embodiment the inventive method further comprises

- storing information about user behavior; and
- inserting content which is aligned with the information about user behavior. In this embodiment the inserted content, e.g. advertisements, can be targeted to a specific viewer. In this way it is possible to increase the impact of an advertisement.

Specifically, the insertion of content comprises replacing in a plurality of video frames a portion of the image by other content. In an alternative embodiment the insertion of content comprises replacing a plurality of video frames as a whole by other video frames.

In yet another embodiment the insertion of content is executed on a server and/or on a cloud computer. This approach may be particularly useful if the content insertion is complex and therefore additional computing power is required.

According to a second aspect, an embodiment of the present invention suggests an apparatus having a display comprising

- a broadcast signal receiver configured to receive a transmitted multimedia stream with incomplete meta-data and to receive meta-data and audio-fingerprints of a first multimedia stream; and
- a processor configured to
  - to detect a shot boundary in the second multimedia stream and a first video frame following the shot boundary in the second multimedia stream;
  - to determine the audio-fingerprint of a sequence of frames including the first video frame;
  - to match the determined audio-fingerprint with an audio-fingerprint of the first multimedia stream;
  - to determine a video sequence in the first multimedia stream corresponding to the matching audio-fingerprint;
  - to detect a shot boundary in the video sequence in the first multimedia stream; and
  - to identify a second video frame following the shot boundary in the video sequence, wherein the second video frame matches with the first video frame.

It has been found useful when the apparatus is provided with means to accumulate information about the viewer behavior.

An embodiment of the inventive apparatus is equipped with a communication interface to request and receive information about the viewer behavior from an external source.

In yet a further embodiment the apparatus includes a memory for storing the accumulated and/or received information about viewer behavior.

Advantageously, the apparatus can comprise a memory for storing information about a plurality of viewers. Having information about a plurality of viewers available makes it possible to target the inserted content to different viewers.

In different embodiments of the invention the apparatus is a television receiver, a mobile communication device or a computer.

An embodiment of the present invention suggests an apparatus having a display. The apparatus comprises a receiver to receive a transmitted video stream and a processor adapted to execute a method according to an embodiment of the invention.

While not explicitly described, the embodiments of the inventive method and apparatus may be employed in any combination or sub-combination.

SHORT DESCRIPTION OF DRAWINGS

Figure 1B:
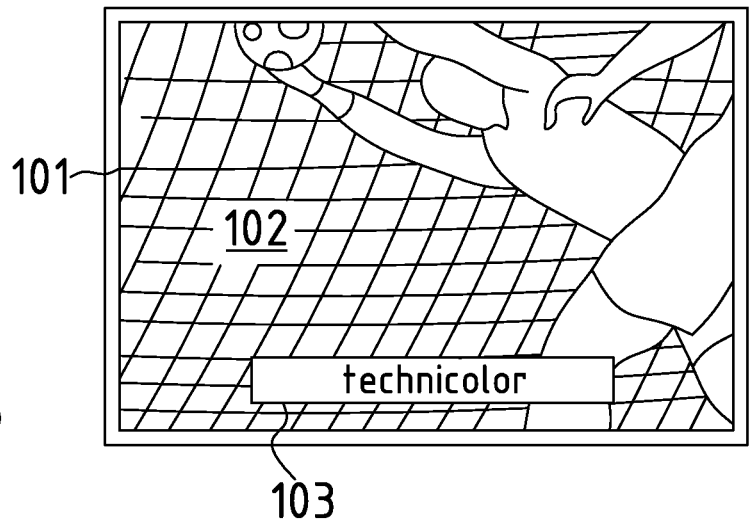
Figure 2:
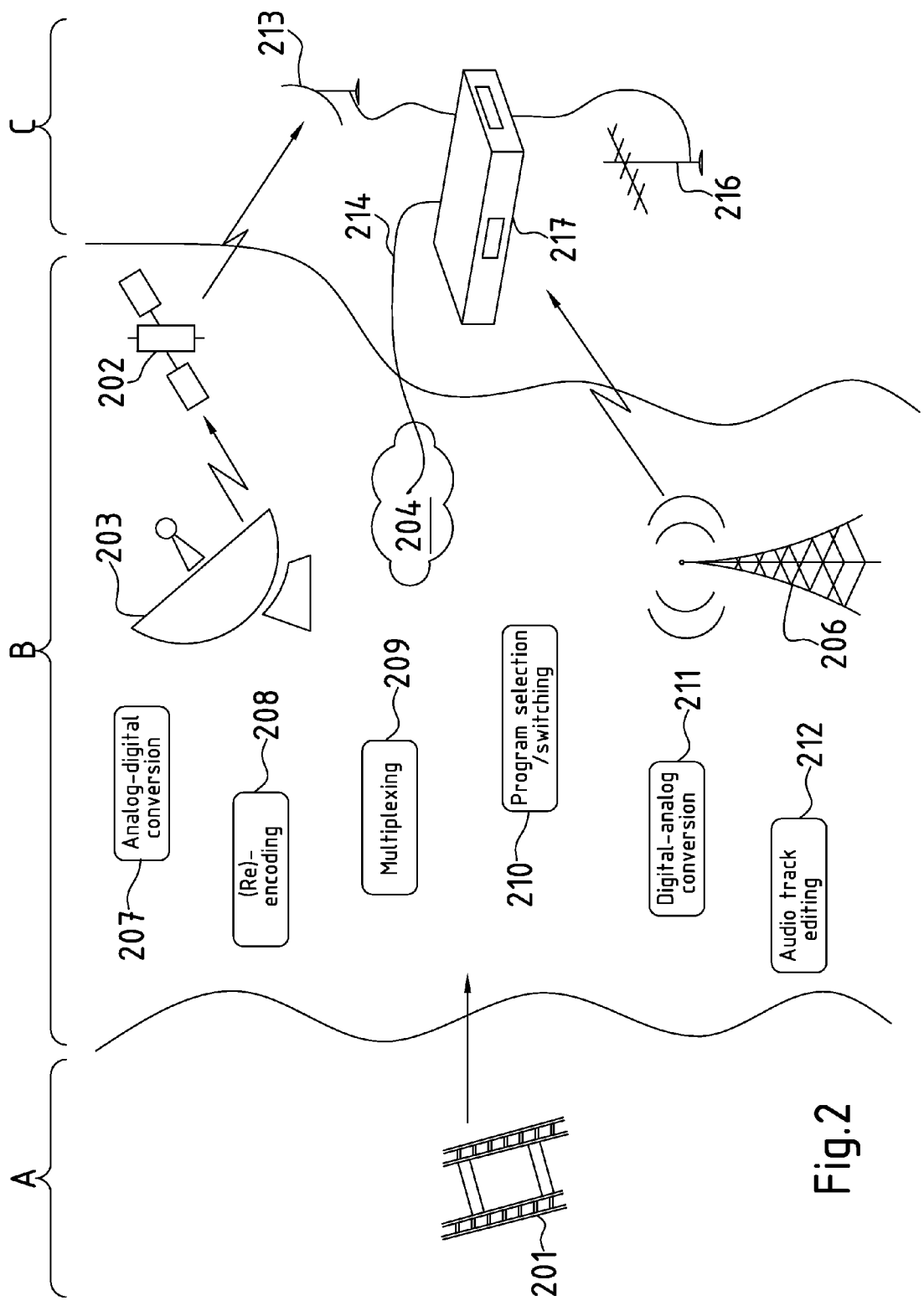
Figure 3A:
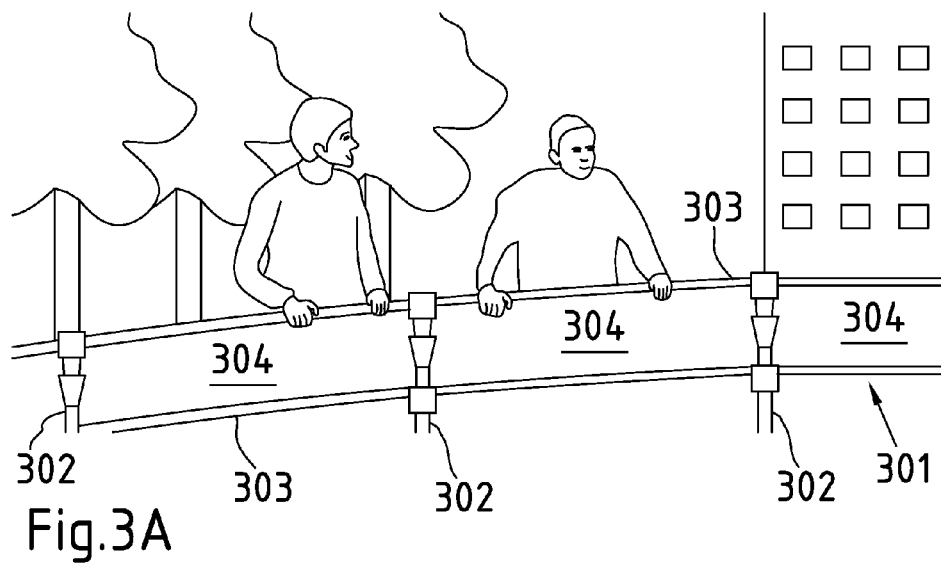
Figure 3B:
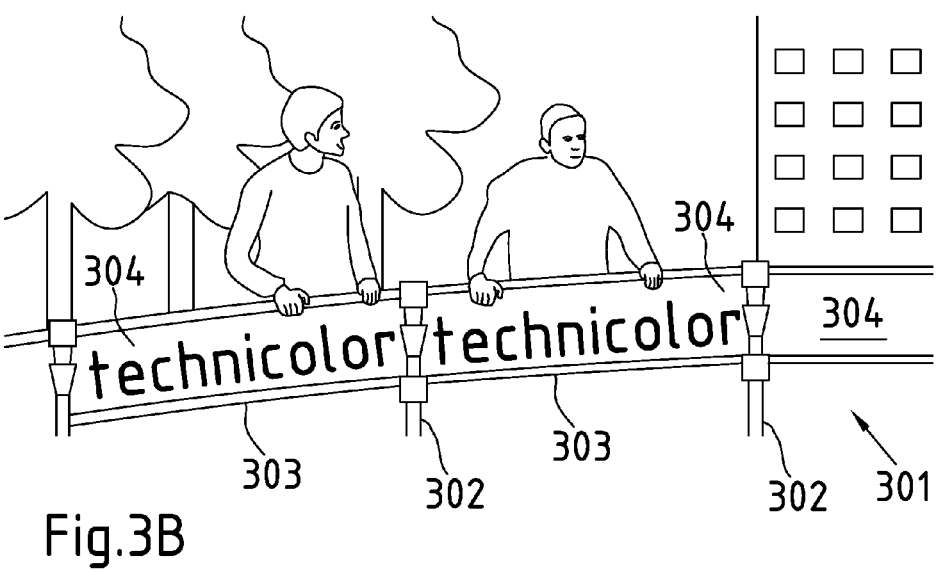
Figure 4:
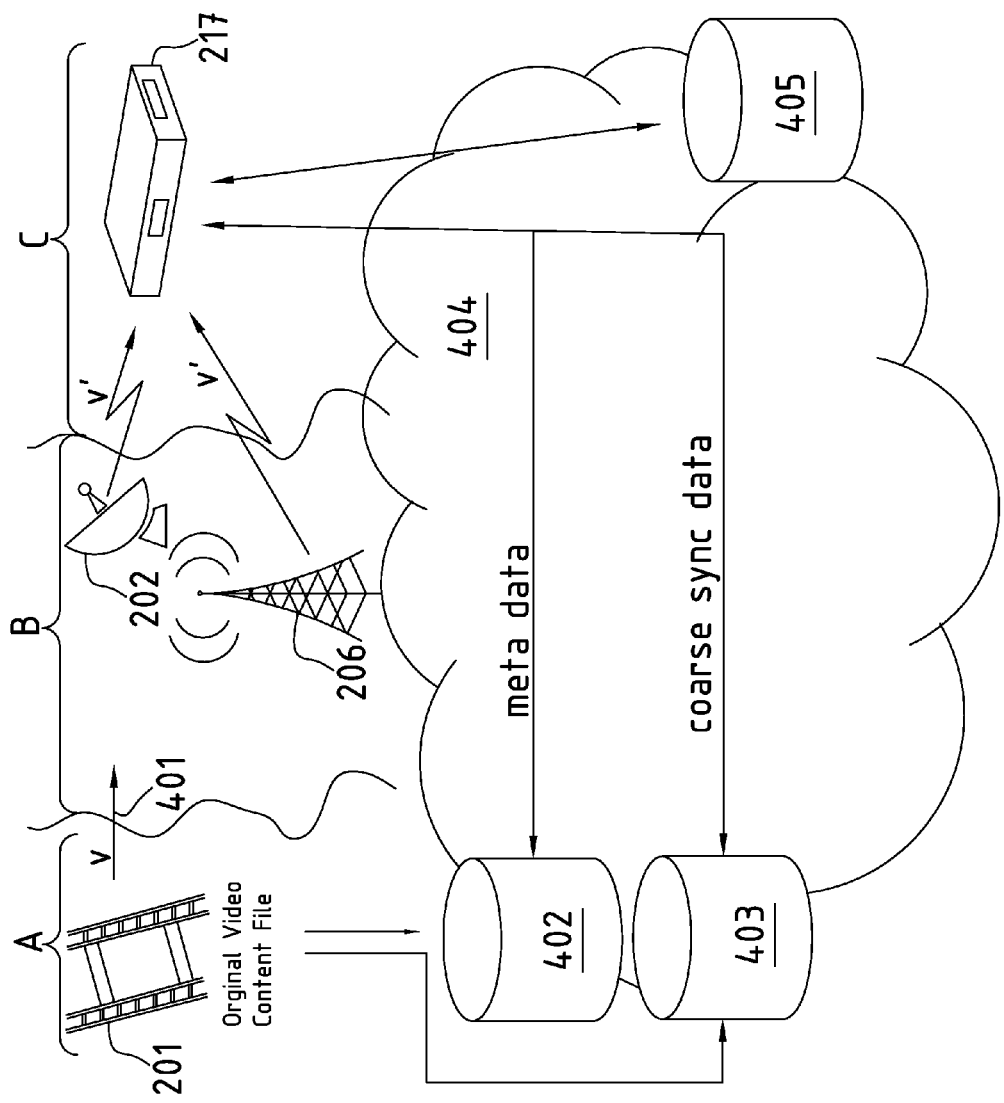
Figure 5:
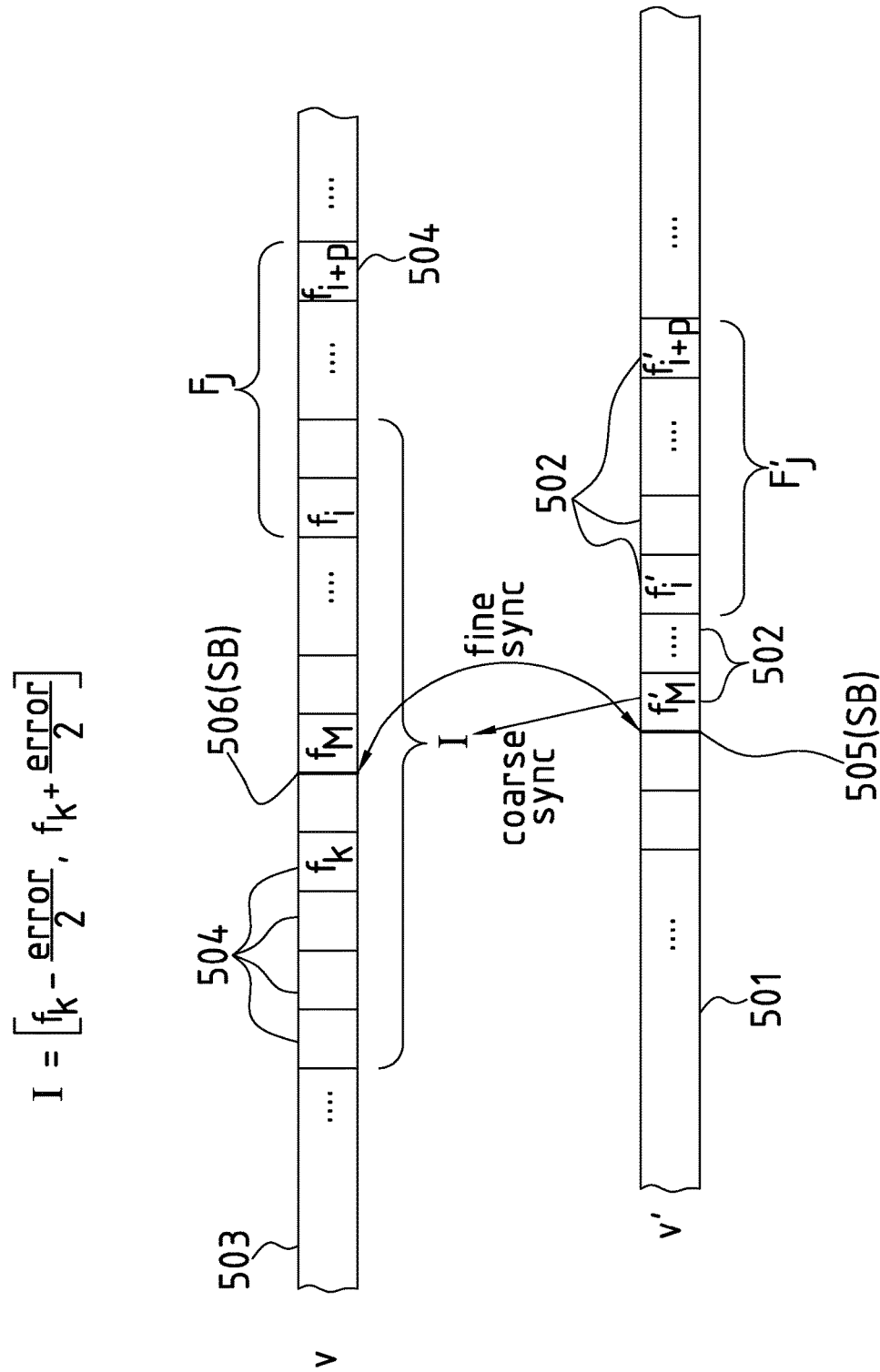
Figure 6:
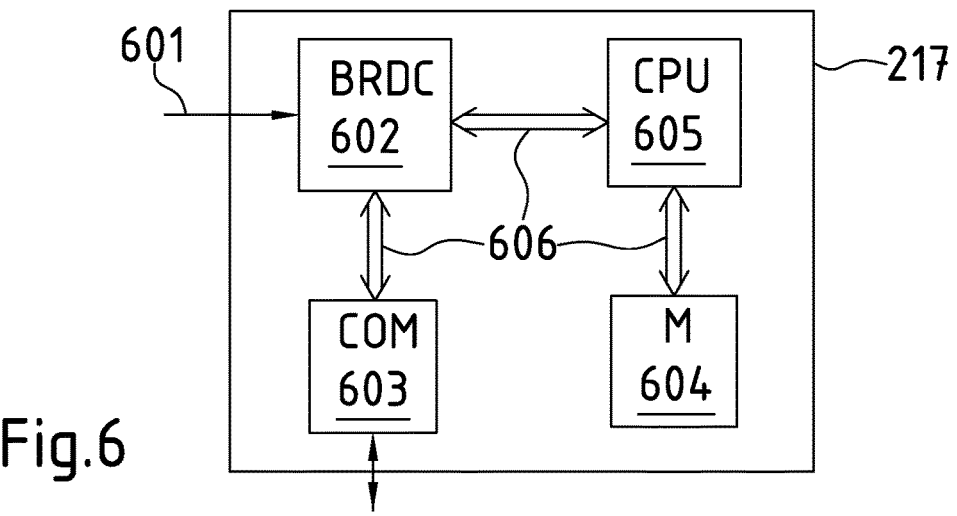
Figure 7:
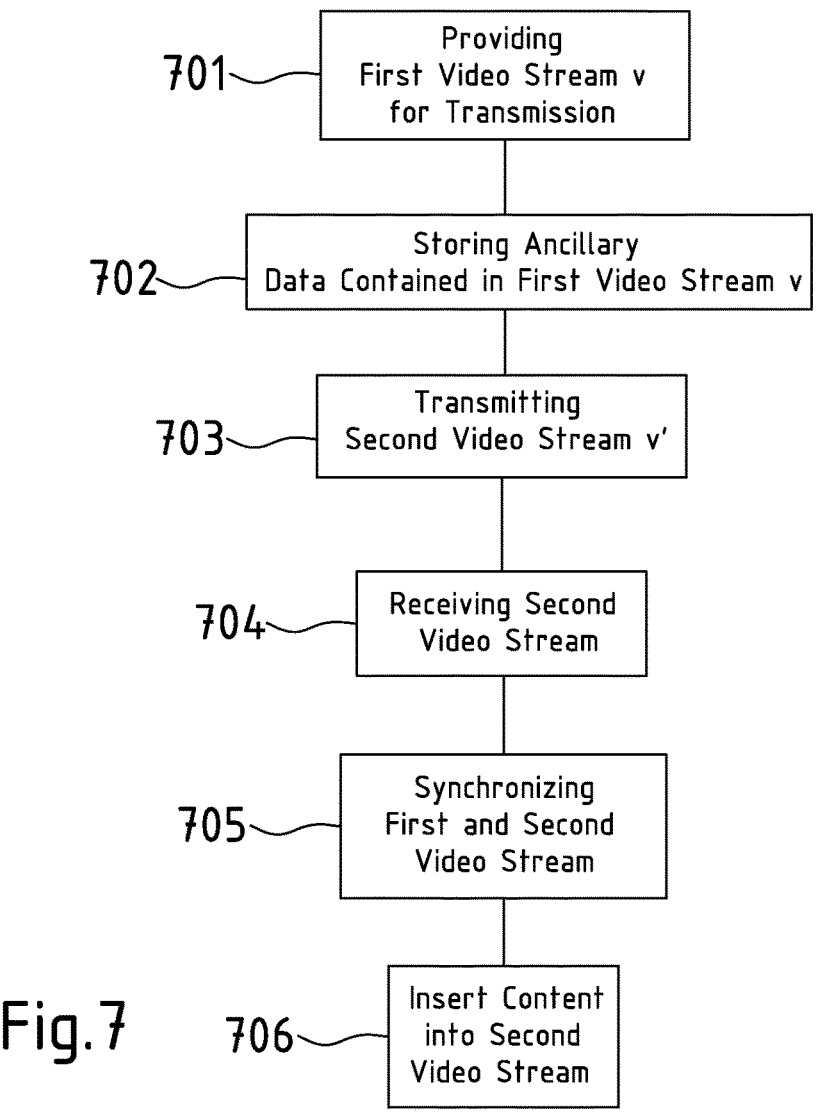

In the drawing an embodiment of the present invention is illustrated. In the figures similar or identical elements are identified with similar or identical reference signs. It shows:

FIGS. 1A and 1B the insertion of an advertisement as a text box in a video scene;

FIG. 2 a schematic illustration of the broadcast chain;

FIGS. 3A and 3B a schematic example of advertisement insertion in a video scene;

FIG. 4 a schematic block diagram of an implementation of the invention;

FIG. 5 schematically illustrates the matching of two corresponding frames in two video streams;

FIG. 6 a schematic block diagram of a TV receiver as example for the inventive apparatus; and FIG. 7 a flow diagram describing the process steps for advertisement insertion.

DETAILED DESCRIPTION

FIG. 1A shows a screen 101 of a television receiver displaying images 102 of a soccer match. FIG. 1B shows an advertisement which is inserted as a text box or banner 103 in the lower part in the image 102 displayed on the screen 101. A portion or the original video content is replaced by the text box 103. This process is also called keying, i.e. the advertisement is keyed into the original video frames. However, this simple approach disturbs the original images and the so created composed image is less appealing for the viewer, especially if the text box 103 covers an interesting detail of the original image.

Embodiments of the present invention provide technology enabling advertisement insertion in a broadcasted video stream in a way that is more appealing than the text box insertion shown in FIG. 1B.

Even though the principles of the present disclosure are equally applicable in a broadcast as well as in a multicast environment, the principles are exemplarily described for broadcast technology at first. Examples of embodiments employing multicast technology will be presented at the end of the description.

FIG. 2 schematically illustrates a video chain reaching from the content owner along the broadcast chain to the premises of a viewer. The realms of the content owner, the broadcast chain and the viewer are shown as distinct sections of FIG. 2 labeled with the reference signs A, B, and C, respectively. A film strip 201 symbolizes content bound to be broadcasted. In the present context the content is any kind of video and/or audio content which is suitable for being broadcasted as a program. In the entire specification of the present patent application, the term "program" refers to content which is transmitted to a viewer via broadcast or multi-cast.

For broadcasting the content as a program there are several options. The first option is to send the program to a satellite 202 via satellite uplink antenna 203. The second option is to send the program to a cable network 204. The cable network 204 is an analog or digital serial network or a data network transmitting packetized data. The third option is to transmit the program via a terrestrial broadcast antenna 206.

In the process of being broadcasted the video content 201 typically undergoes several processing steps which are shown in FIG. 2 as blocks 207 to 212. It is to be noted that not necessarily every processing step shown in FIG. 2 is always executed but, conversely, there may be other processing steps not shown in FIG. 2 which are applied to a specific content. The processing may involve an analog-to-digital conversion 207, re-encoding 208, multiplexing 209, program selection/switching 210, digital to analog conversion 211, and audio track editing 212.

The viewer has the option to receive the content via a satellite dish antenna 213, a cable network access 214 and a terrestrial antenna 216 connected to a television receiver which is symbolized in FIG. 2 as a set-top box 217. The set-top box 217 or TV receiver has information character-izing the interests of the viewer, briefly called "user information". Optionally, the user information also includes other information related to the viewer's interest, such as geographical location of the set-top box 217, selected menu language, etc. According to different embodiments of the invention, the information is accumulated by the set-top box 217 itself, sent from a service provider or requested by the set-top box from a service provider. In one embodiment the information is stored in the set-top box 217 as a file or data base. In another embodiment the information is stored in a computer cloud or on a server. In that case the set-top box 217 queries the information each time when it is required.

In another embodiment of the present invention the user information is stored outside the set-top box 217, e.g. in a storage device or server communicatively connected with the set-top box 217. It is not essential for the present invention where or in what kind of device the user information is stored.

In an embodiment of the present invention the set-top box 217 stores such information for a plurality of users.

In the present patent application, the terms "television receiver" or "receiver" refer to any device which incorporates means for receiving an incoming video signal. Such kind of devices include, but are not limited to, television sets, Bluray and/or DVD players and recorders, set-top boxes, PC cards, computers, smartphones, smart watches, tablet computers, wearable head-up displays etc. It is noted that all mentioned devices include a display and driver circuit for driving the display.

The plurality of processing steps within the broadcast chain frequently results in a loss of meta-data that is associated with the original content and in consequence it is no longer possible to insert advertisements at the right place in the right moment in a sequence of video frames. However, precise timing and positioning in the sense that the insertion of the advertisement is frame accurate, i.e. exactly in the frames that were specified by the meta-data, is essential. For a good quality impression of the viewer it is very important that the insertion does not take place one single frame too early or too late. The reason why this strict requirement is indispensable for the final sequence of video frames with inserted targeted content will be explained in connection with FIGS. 3A and 3B.

FIG. 3A shows a scene with two persons standing on a bridge having a railing 301. The scene is a sequence of video frames forming part of the program selected by the viewer. The TV receiver 217 holds information characterizing the interests of the viewer. The information enables the TV receiver 217 to select advertisements that are actually interesting for the viewer. This type of advertisements is also referred to as "targeted content". The TV receiver 217 receives frame information identifying frames and areas inside the frames that are appropriate for inserting targeted content.

The railing 301 shown in FIG. 3A is composed of posts 302 and rails 303 defining fields 304 in the railing 301. The fields 304 are identified as a suitable image area for advertisement insertion. FIG. 3B shows the company name "Technicolor"® as advertisement in two fields 304. The company name "Technicolor" is only an example for an advertisement and any kind of alphanumeric or graphic presentation may be inserted in the fields 304. Also, the advertisement may be inserted only in one field 304 or in more than two fields 304 and also in other fields 304 than in those shown in FIG. 3B. In one embodiment of the present invention even a video clip is inserted as advertisement. But regardless of the content of the advertisement it is of utmost importance that the advertisement is inserted in a frame accurate manner, i.e. not one frame too early or too late. For the purpose of explanation let us assume that FIG. 3A shows a video frame out of a sequence of video frames created by a camera pan. In this case the positions of the fields 304 change slightly from frame to frame which means that the advertisement has to be inserted in each video frame at a slightly different position in order to fit properly into the fields 304 of the railing 301 as it is shown in FIG. 3B. If given position data of the advertisement is not matched with the right video frame, the advertisement is at least slightly displaced compromising the quality impression of the scene for the viewer. Similar problems occur when there is a so called "hard cut" between scenes, i.e. the image contents of frame number N is completely different from the image contents of frame number N−1 or N+1. Obviously, in the situation of a hard cut an advertisement that is adapted to frame number N is completely out of context in frame N−1 or N+1, respectively. Again, the viewer would get a bad quality impression of the composed image.

In general terms the described problem can be expressed as follows: The starting point is an original video v composed of a sequence of video frames $f_i$. The video stream is part of a more general multimedia stream that contains at least a video stream and an accompanying audio stream. The same is true for any other video stream mentioned further below in the specification. In other words, the original video v represents a physical and mathematical quantity comprising the video frames f, as elements $v=\{f_1, \ldots, f_n\}$. A sub-quantity or subset $F_j$ of these frames is appropriate for inserting or inlaying advertisements and is important for this reason, wherein $F_j=\{f_k, \ldots, f_m\}$. The subset $F_j$ is identified in data called "frame information".

The transformations and the streaming of the video v along the broadcast chain introduce changes and the video v becomes video stream v'. The television receiver receives the video stream v' composed of frames $f_i'$, i.e. $v'=\{f_1', \ldots, f_n'\}$. According to an embodiment of the present invention the TV receiver 217 inserts in a subset of frames $F_j'$ corresponding to the identified frames $F_j$ advertisements as targeted content based on the stored user information. For doing so, the TV receiver 217 has to match the already identified frames $F_j=\{f_k, \ldots, f_m\}$ with the corresponding frames $F_j'=\{f_k', \ldots, f_m'\}$ in the video stream v' to properly insert an advertisement. As long as all video transformations of v are perfectly controlled by one entity like a video game console it is relatively easy to do a frame accurate matching and track which original frame corresponds to which transformed frame. This is no longer the case when video or multimedia streams are broadcasted.

The present disclosure addresses the problem of frame accurate insertion without the availability of reliable or complete meta-data. As it was mentioned above, in the broadcast environment any marker in the broadcasted program has a risk to get lost. The only synchronization that imperatively has to be maintained by the broadcast service is the lip-sync between audio and video in a program.

This is why known solutions use the audio track of a video to synchronize the two video streams v and v'. More precisely a server provides descriptions (also called fingerprints or signatures) of pieces of the audio track of original video stream v. For each fingerprint a server also provides the corresponding frames $f_i$. The television receiver 217 extracts the audio fingerprints of the broadcasted video stream v' and matches the fingerprints against all signatures provided by the server for that particular video. If two audio fingerprints are matching, the video player can map received video frames $f_i'$ to the original frames $f_i$.

The advantage of this approach is that audio fingerprinting is not costly and can easily be carried out in real-time by a device such as a STB. The problem of this approach is that the synchronization achieved with the above technique has an accuracy of a few frames only because intrinsically lip-sync only guarantees a precision of a few frames. E.g. if a video frame $f_M'$ from the video stream v' is matched by audio fingerprints to a frame in the original video stream the result lies only in a range of a few frames to the actually corresponding video frame $f_M$.

The method carried out by an embodiment of the present invention is illustrated in a block diagram shown in FIG. 4. The coarse frame synchronization uses state-of-the-art real time synchronization techniques based on audio-fingerprints. The content owner sends the original video v to the broadcast chain as it is indicated by arrow 401 reaching from the realm A of the content owner to the realm B of the broadcast chain. In addition to that, the content owner sends meta-data to a meta-data server 402 with frame numbers or time codes of images suitable for content insertion as well as coordinates of the image area appropriate for advertisement insertions inside the image. The content owner sends an audio fingerprint database for coarse frame synchronization to a server 403. The meta-data and the fingerprint data bases are globally referred to as ancillary data.

In an alternative embodiment the functionalities of servers 402 to 403 are integrated into a single server.

The TV receiver 217 and the servers 402 and 403 are communicatively connected by a broadband communication network 404 such as the Internet.

When the television receiver 217 receives a video stream v' it determines if the currently played video offers opportunities to inlay advertisements by contacting the server 402 via a broadband connection and requests meta-data for the received video stream. The meta-data server 402 answers with meta-data required to carry out inlay operations: the frame numbers or time codes of images suitable for content inlay. Optionally, the server 402 also provides for each image in the identified image sequence, the coordinates of the inlay zone inside the image, geometrical distortion of the inlay zone, color map used, light setting etc. The TV receiver 217 contacts the server 403 and requests the audio-fingerprint database. In order to be able to insert the advertisement based on the received meta-data the television receiver 217 needs to synchronize the received video stream v' with the time codes and/or frame numbers provided by the meta-data.

In the following the synchronization will be explained in greater detail with reference to FIG. 5. The broadcasted video stream v' is symbolized as a band 501 composed of a sequence of video frames shown as sections 502 in the band 501. Similarly, the original video stream v is shown as a band 503 composed of a sequence of video frames shown as sections 504 in the band 503. Shot boundaries (SB) 505 and 506 are displayed as bold separation line between two consecutive video frames in either videos stream v and v'. A shot boundary in general marks the beginning of a camera shot. The term "shot" is defined a series of interrelated consecutive video frames taken contiguously by a single camera. Even though in FIG. 5 only one shot boundary is shown in each video stream v and v' there may be many more of them. However, for the purpose of explaining the synchronization between the two videos streams v and v' a single shot boundary is sufficient.

The TV receiver 217 detects the shot boundary (SB) 505 in the broadcasted video stream v' utilizing known technologies, e.g. as published in [1] and identifies the first video frame $f'_M$ following the shot boundary 505. At this point the frame number of video frame $f'_M$ is not known. The TV receiver 217 calculates the audio-fingerprint of a sequence of video frames $f'_i$ including the video frame $f'_M$ and looks for a matching audio-fingerprint in the audio-fingerprint database received from server 403. Let us assume that the matching audio-fingerprint from the database is associated with video frame $f_k$ of the original video stream v. In this way a video frame $f_M$ (of the original video stream v) that corresponds to the video frame $f'_M$ (of the broadcasted video stream v') lays within the short video sequence or interval I composed of 5 to 6 video frames, i.e.

$$f'_M \in I = [f_{k-error/2}, f_{k+error/2}]$$

This represents only a coarse synchronization between video streams v and v' and has not yet satisfied the requirement of frame accuracy. Therefore, the TV receiver 217 looks for a shot boundary within this short video sequence, i.e. within the interval I. The TV receiver 217 identifies the shot boundary 506 and the first video frame after the shot boundary as video frame $f_M$ corresponding to the video frame $f'_M$. This identification corresponds to a fine synchronization between the video streams v and v' because now frame accurate matching of corresponding video frames is obtained.

In an embodiment of the suggested method the audio-fingerprints are determined from sequences of video frames from the first and the second video streams v, v' having the same length. In other embodiments the length of the sequences can vary.

After having established the synchronization described above, the frame numbers of video frames $f_M$ and $f'_M$, respectively, are known. The frame numbers of the video sequence $F_j = \{f_i, f_{1+p}\}$ where the targeted content shall be inserted are known as well from the meta-data provided by server 402. It is thus simple for the TV receiver 217 to identify the corresponding video sequence $F'_j = \{f'_i, f'_{i+p}\}$ in the broadcasted video stream v'. In most cases the targeted content contains advertisements. However, the present invention is not limited to the insertion of advertisements.

According to an embodiment of the present invention the TV receiver 217 performs the advertisement insertion itself. For this purpose the TV receiver 217 requests from a server 405 (FIG. 4) the coordinates of the inlay zone where the advertisement is to be placed and the advertisement itself. The communication between the servers 402 to 405 and the TV receiver is effected by the broadband communication network 404. The creation of a composed image based on the video sequence $F'_j$ in which in the inlay zone the original image content is replaced by the advertisement is performed by the computing power of the TV receiver 217. The composed video frames are denominated as $F''_j$.

Even though the information, what kind of advertisement is to be inserted, is optionally provided by external resources it is the TV receiver 217 which executes the insertion process.

In another embodiment of the present invention the TV receiver 217 sends the video frames $F'_j$ to the server 405 which performs the advertisement insertion into the video frames $F'_j$ and sends the composed video frames $F''_j$ back to the TV receiver 217. The TV receiver 217 replaces the video frames $F'_j$ by the video frames $F''_j$ in the video stream v' for display.

In an alternative embodiment the insertion of the advertisement is performed in a cloud computer where the frames $F''_j$ are optionally stored for later use. The composed frames $F''_j$ are sent back to the TV receiver 217 where they replace corresponding frames $F'_j$.

FIG. 6 shows a schematic block diagram of TV receiver 217. The TV receiver receives the broadcast signals at input 601 symbolizing all different kinds of inputs for broadcast signals already described with reference to FIG. 2. The receiver 217 comprises a broadcast signal receiver 602 for receiving broadcast signals that receives and process broadcasts signals that are ultimately displayed on a screen. The TV receiver 217 also comprises a communication interface 603 enabling the TV receiver to communicate with the broadband network 404. The communication interface 603 enables the receiver 217 to request and to receive information about viewer behavior from an external data source such as a server. This server may be the server 405 or it may be a different server. Data that is necessary to execute the described method is stored in a memory 604, e.g. information about viewer behavior. A central processing unit (CPU) 605 controls all processes in the TV receiver. The components 602 to 605 are communicatively connected by a bi-directional bus 606.

Even though the components 602 to 605 are shown as separate components they can all or partially be integrated in a single component.

FIG. 7 shows a schematic flow diagram illustrating the method according to an embodiment of the present invention. In step 701 the first video stream v including its associated meta-data is provided for being transmitted. In step 702 the ancillary data comprising the meta-data, the fingerprint data bases for coarse synchronization associated with video stream v are stored on the servers 402, 403 as it is described with reference to FIG. 4. In step 703 the second video stream v' is transmitted as it is explained in connection with FIG. 2. The TV receiver 217 receives the transmitted second video stream v' in step 704 and executes the synchronization of the first and second video stream v, v' in step 705.

According to another embodiment of the present invention in step 706 advertisements are inserted into the video frames predetermined by the meta-data forming part of the ancillary data.

As a result, frame accurate content insertion into transmitted video streams without relying on meta-data included in the video stream v' is enabled. It is noted that the viewer can skip the so inserted advertisements only by skipping a part of the content of the watched program. For most viewers this is not an option and therefore the inserted advertisements will reach the targeted audience.

The methods described in the present disclosure are also applicable to smartphones, tablet computers or any other mobile communication device provided with a display and capable of receiving multicast video content, e.g. by using Multimedia Broadcast Multicast Services (MBMS). MBMS is a point-to-multipoint interface specification for existing and upcoming 3GPP cellular networks. A more advanced technology is Evolved Multimedia Broadcast Multicast Services (eMBMS) based on 4G cellular networks. Target applications include mobile TV and radio broadcasting.

Like in the broadcast chain, meta-data can get corrupted or lost in a multicast environment. Hence, the same problems that have been described in the context with broadcasted content need to be solved for inserting targeted content into a video stream which is transmitted as multicast content.

The mobile communication device receives multimedia content via a cellular network and contacts via a communication network such as the Internet the servers 402, 403 to receive ancillary data to perform a frame accurate synchronization of the original video stream and the multicast video stream. In addition to that, the mobile communication device contacts via the communication network 404 also the server 405 for receiving targeted content to be inserted into the multi-casted video stream. The insertion is performed on the level of the mobile communication device. Alternatively, the mobile communication device contacts the server 405 to receive replacement frame $F_j''$ to replace the frames $F_j'$ in the transmitted video stream.

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, and the like represent various processes which may be substantially represented in computer readable storage media and so executed by a computer or processor, whether or not such computer or processor is explicitly shown.

| Reference Signs List | |
|---|---|
| 101 | TV screen |
| 102 | image |
| 103 | textbox |
| 201 | film strip |
| 202 | satellite uplink antenna |
| 203 | satellite |
| 204 | cable network |
| 206 | terrestrial broadcast antenna |
| 207-212 | processing steps |
| 213 | satellite dish antenna |
| 214 | cable network access |
| 216 | terrestrial reception antenna |
| 217 | set-top box |
| 301 | railing |
| 302 | post |
| 303 | rail |
| 304 | field |
| 401 | send original video v |
| 402 | meta-data server |
| 403 | server for coarse synchronization fingerprint data |
| 404 | broadband network |
| 405 | server for coordinates and advertisement |
| 407 | broadband communication network |
| 501, 503 | video streams v', v |
| 502, 504 | video frames |
| 505, 506 | shot boundaries |
| 601 | broadcast input |
| 602 | broadcast signal receiver (BRDC) |
| 603 | communication interface (COM) |
| 604 | memory (M) |
| 605 | CPU |
| 606 | bus |
| 701-706 | processing steps |
| A | realm of content owner |
| B | realm of broadcast chain |
| C | realm of viewer |

NON-PATENT LITERATURE

[1] "Shot-boundary detection: unraveled and resolved?", Circuits and Systems for Video Technology, IEEE Transactions on (Volume:12, Issue: 2)

The invention claimed is:

1. Method for matching a corresponding video frame in a first and a second multimedia streams containing multimedia data, wherein the multimedia data include at least a video stream and an audio stream, wherein the first multimedia stream is provided with meta-data, and wherein the method comprises:
  receiving the second multimedia stream;
  receiving the meta-data and audio-fingerprints of the first multimedia stream;
  detecting a video shot boundary in the second multimedia stream and a first video frame following the video shot boundary in the second multimedia stream;
  determining the audio-fingerprint of a sequence of video frames including the video shot boundary and the first video frame after the video shot boundary has been detected in the second multimedia stream;
  matching the determined audio-fingerprint with an audio-fingerprint of the first multimedia stream, wherein the audio-finger print matching is used to determine coarse synchronization of a sequence of corresponding video frames in the first and the second multimedia streams, the coarse synchronization does not satisfy frame accurate synchronization of the corresponding video frame;
  determining a video sequence in the first multimedia stream corresponding to the matching audio-fingerprint to provide the coarse synchronization;
  detecting a video shot boundary in the video sequence in the first multimedia stream; and
  identifying a second video frame following the video shot boundary in the video sequence, wherein the second video frame matches with the first video frame to provide the frame accurate synchronization of the corresponding video frame.

2. Method according to claim 1, wherein the method further comprises inserting content into the second multimedia stream.

3. Method according to claim 2, wherein the method further comprises requesting content from a server before inserting the content into the second multimedia stream.

4. Method according to claim 3, wherein the method further comprises
  storing information about user behavior; and
  inserting content which is aligned with the information about user behavior.

5. Method according to claim 2, wherein inserting content comprises replacing at least a portion of the second multimedia stream by other content.

6. Method according to claim 2, wherein inserting content comprises replacing a plurality of video frames as a whole by other video frames.

7. Method according to claim 2, inserting the content is executed on a server and/or on a cloud computer.

8. Apparatus for matching a corresponding video frame in a first and a second multimedia streams comprising
  a broadcast signal receiver configured to receive the first multimedia stream transmitted with meta-data and audio-fingerprints of the first multimedia stream, wherein the received transmitted first multimedia stream at the receiver being a second multimedia stream; and
  a processor configured to detect a video shot boundary in the second multimedia stream and a first video frame following the video shot boundary in the second multimedia stream;

to determine the audio-fingerprint of a sequence of frames including the shot boundary and the first video frame after the shot boundary has been detected in the second multimedia stream;

to match the determined audio-fingerprint with an audio-fingerprint of the first multimedia stream, wherein the audio-finger print matching is used to determine coarse synchronization of a sequence of corresponding video frames in the first and the second multimedia streams, the coarse synchronization does not satisfy frame accurate synchronization of the corresponding video frame;

to determine a video sequence in the first multimedia stream corresponding to the matching audio-fingerprint to provide the coarse synchronization;

to detect a video shot boundary in the video sequence in the first multimedia stream; and to identify a second video frame following the video shot boundary in the video sequence, wherein the second video frame matches with the first video frame to provide the frame accurate synchronization of the corresponding video frame.

9. Apparatus according to claim 8, wherein the processor is adapted to accumulate information about viewer behavior.

10. Apparatus according to claim 8, wherein the apparatus is equipped with communication interface adapted to request and to receive information about viewer behavior from an external source.

11. Apparatus according to claim 9, wherein the apparatus is equipped with communication interface adapted to request and to receive information about viewer behavior from an external source.

12. Apparatus according to claim 9, wherein the apparatus includes a memory for storing the accumulated and/or received information about viewer behavior.

13. Apparatus according to claim 10, wherein the apparatus includes a memory for storing the accumulated and/or received information about viewer behavior.

14. Apparatus according to claim 9, wherein the apparatus includes a memory for storing information about a plurality of viewers.

15. Apparatus according to claim 10, wherein the apparatus includes a memory for storing information about a plurality of viewers.

16. A computer program product stored in non-transitory computer-readable storage media for matching a corresponding frame in a first and a second multimedia streams containing multimedia data, wherein the multimedia data include at least a video stream and an audio stream, wherein the first multimedia stream is provided with meta-data, comprising computer-executable instructions for a television receiver, wherein the instructions comprising:

receiving the second multimedia stream;

receiving the meta-data and audio-fingerprints of the first multimedia stream;

detecting a video shot boundary in the second multimedia stream and a first video frame following the video shot boundary in the second multimedia stream;

determining the audio-fingerprint of a sequence of video frames including the video shot boundary and the first video frame after the video shot boundary has been detected in the second multimedia stream;

matching the determined audio-fingerprint with an audio-fingerprint of the first multimedia stream, wherein the audio-finger print matching is used to determine coarse synchronization of a sequence of corresponding video frames in the first and the second multimedia streams, the coarse synchronization does not satisfy frame accurate synchronization of the corresponding video frame;

determining a video sequence in the first multimedia stream corresponding to the matching audio-fingerprint to provide the coarse synchronization;

detecting a video shot boundary in the video sequence in the first multimedia stream; and identifying a second video frame following the video shot boundary in the video sequence, wherein the second video frame matches with the first video frame to provide the frame accurate synchronization of the corresponding video frame.

* * * * *